United States Patent
Osumi

[19]

[11] Patent Number: 6,141,966
[45] Date of Patent: Nov. 7, 2000

[54] POWER GENERATING DEVICE EMPLOYING HYDROGEN ABSORBING ALLOY AND LOW HEAT

[76] Inventor: Yasuaki Osumi, 2116-21 Iiyama, Atsugi-shi, Kanagawa, 243-02, Japan

[21] Appl. No.: 09/202,625
[22] PCT Filed: Jun. 21, 1996
[86] PCT No.: PCT/JP96/01741
  § 371 Date: Dec. 16, 1998
  § 102(e) Date: Dec. 16, 1998
[87] PCT Pub. No.: WO97/48887
  PCT Pub. Date: Dec. 24, 1997
[51] Int. Cl.$^7$ .................................................. F01K 25/06
[52] U.S. Cl. .......................... 60/673; 60/676; 60/641.2; 60/641.8
[58] Field of Search ................. 60/641.1, 641.2, 60/641.8, 671, 673, 676

[56] References Cited

U.S. PATENT DOCUMENTS

| | | | |
|---|---|---|---|
| 4,198,827 | 4/1980 | Terry et al. | 60/649 |
| 5,638,673 | 6/1997 | Yabe | 60/673 X |
| 5,806,316 | 9/1998 | Avakov et al. | 60/673 X |

FOREIGN PATENT DOCUMENTS

| | | |
|---|---|---|
| 55-5394 | 4/1980 | Japan . |
| 6114101 | 1/1986 | Japan . |
| 2272269 | 9/1990 | Japan . |
| 7243717 | 9/1995 | Japan . |
| 7286793 | 10/1995 | Japan . |

*Primary Examiner*—Hoang Nguyen
*Attorney, Agent, or Firm*—Curtis L. Harrington

[57] ABSTRACT

A power generating device employing hydrogen absorbing alloy and low heat wherein two types of hydrogen absorbing alloys that can reversibly absorb and release hydrogen gas and have different thermal equilibrium hydrogen pressure characteristics are used and loaded, respectively, in a first hydrogen absorbing alloy heat exchanger container (1) and a second hydrogen absorbing alloy heat exchanger container (2) that are ventilably connected to each other, wherein at least two sets of heat generating cycles are provided that employ heat generated when hydrogen gas is moved between the first hydrogen absorbing alloy heat exchanger container (1) and the second hydrogen absorbing alloy heat exchanger container (2), wherein a low temperature side hydrogen absorbing alloy hydrogen compound that has a higher equilibrium hydrogen pressure at the same temperature is heated by low quality heat sources (8, 9, 10), wherein released hydrogen is absorbed by a high temperature side hydrogen absorbing alloy having a lower equilibrium hydrogen pressure to thereby obtain heat having a temperature that is higher than the temperature of the low quality heat sources, and wherein cooling medium vapour is generated by the heat so obtained so that power generation can be effected by a gas turbine (13).

2 Claims, 2 Drawing Sheets

6,141,966

POWER GENERATING DEVICE EMPLOYING HYDROGEN ABSORBING ALLOY AND LOW HEAT

TECHNICAL FIELD

This invention relates to a power generating device which converts unused low quality heat energy having a temperature from 30° C. to 60° C. such as heat collected by solar energy collectors, heat of terrestrial heat energy, warm waste water discharged from hot springs, waste heat discharged from factories and garbage destructors into heat having a higher temperature from 80° C. to 90° C., and transmits the heat to a medium having a low boiling point for a vaporization so that thus obtained vapour drives a turbine to generate power, and can be universally used as a system for converting unused energy to generate power.

BACKGROUND OF ART

As one of prior power generating devices using a turbine, a device employing power of a turbine driven by vapour of a heating medium is generally and universally used.

In such a power generating device employing a gas turbine, power generation can be effected in the manner that cooling medium vapour such as steam, ammonia, fluorocarbon, or vapour obtained by vaporizing heating medium such as natural gas with heat is pressed and introduced into the gas turbine to drive the gas turbine, discharged vapour from the gas turbine is cooled and condensed, and thus obtained liquid medium is re-heated to be circulatively introduced into the gas turbine as pressed vapour. In the device, however, a temperature difference between a heating temperature and a cooling temperature should be extremely great, namely 100° C. or greater. In fact, it is difficult to drive the gas turbine of the device with a heating source having a temperature of about 150° C. and a cooling source having a temperature from 10 to 30° C. due to extreme poor thermal efficiency and high cost of equipment.

A power generating device employing hydrogen absorbing alloys which makes use of power of a turbine driven with hydrogen gas has been developed in these years.

In such a power generating device making use of a hydrogen gas turbine, power generation can be effected in the manner that a device loaded with a hydrogen compound of a hydrogen absorbing alloy is heated with a heat source having a temperature from 300 to 350° C. to introduce released hydrogen having a high temperature and a high pressure so as to drive the hydrogen gas turbine, and then discharged hydrogen from the hydrogen gas turbine is introduced into another device loaded with a hydrogen absorbing alloy and absorbed by the hydrogen absorbing alloy so that the device is also heated to circulatively introduce hydrogen having a high temperature and a high pressure into the hydrogen gas turbine. The device, however, has problems such that more hydrogen should be moved than in a heat pump employing hydrogen absorbing alloy, and a heating source at a high temperature side should have a temperature from 300 to 350° C., thereby a temperature to release hydrogen rises, thermal efficiency becomes very poor, employed hydrogen absorbing alloys are deteriorated and declined in quality and durability, and cost of equipment is increased.

The present invention is to solve the above mentioned problems of the prior power generating devices and has an object to provide an economical power generating device with high thermal conversion efficiency which can be used in various fields.

DISCLOSURE OF INVENTION

The present invention relates to a power generating device employing hydrogen absorbing alloys and low heat wherein two types of hydrogen absorbing alloys that can reversibly absorb and release hydrogen gas and have different thermal equilibrium hydrogen pressure characteristics are used and loaded, respectively, in a first hydrogen absorbing alloy heat exchanger container and a second hydrogen absorbing alloy heat exchanger container that are ventilably connected to each other, wherein at least two sets of heat generating cycles are provided that employ heat generated when hydrogen gas is moved between the first hydrogen absorbing alloy heat exchanger container and the second hydrogen absorbing alloy heat exchanger container, wherein a hydrogen compound of one of the hydrogen absorbing alloys at a low temperature side that has a higher equilibrium pressure at the same temperature is heated by low quality heat sources to release hydrogen, wherein the released hydrogen is absorbed by the other hydrogen absorbing alloy at a high temperature side having a lower equilibrium hydrogen pressure to thereby obtain heat having a temperature that is higher than the temperature of the low quality heat sources, and wherein cooling medium vapour is generated by thus obtained heat so that power generation can be effected by a gas turbine. The present device enables to convert low temperature energy which has not been utilized into high temperature energy employing hydrogen absorbing alloys to generate power, with the high temperature energy, efficiently. High temperature heat sources from 150 to 350° C. used in the prior power generations are no longer required for the present device due to its high thermal conversion efficiency so that the present device is extremely economical.

BELIEF DESCRIPTION OF DRAWINGS

DESCRIPTION OF THE PREFERRED EMBODIMENTS

Figure 1:
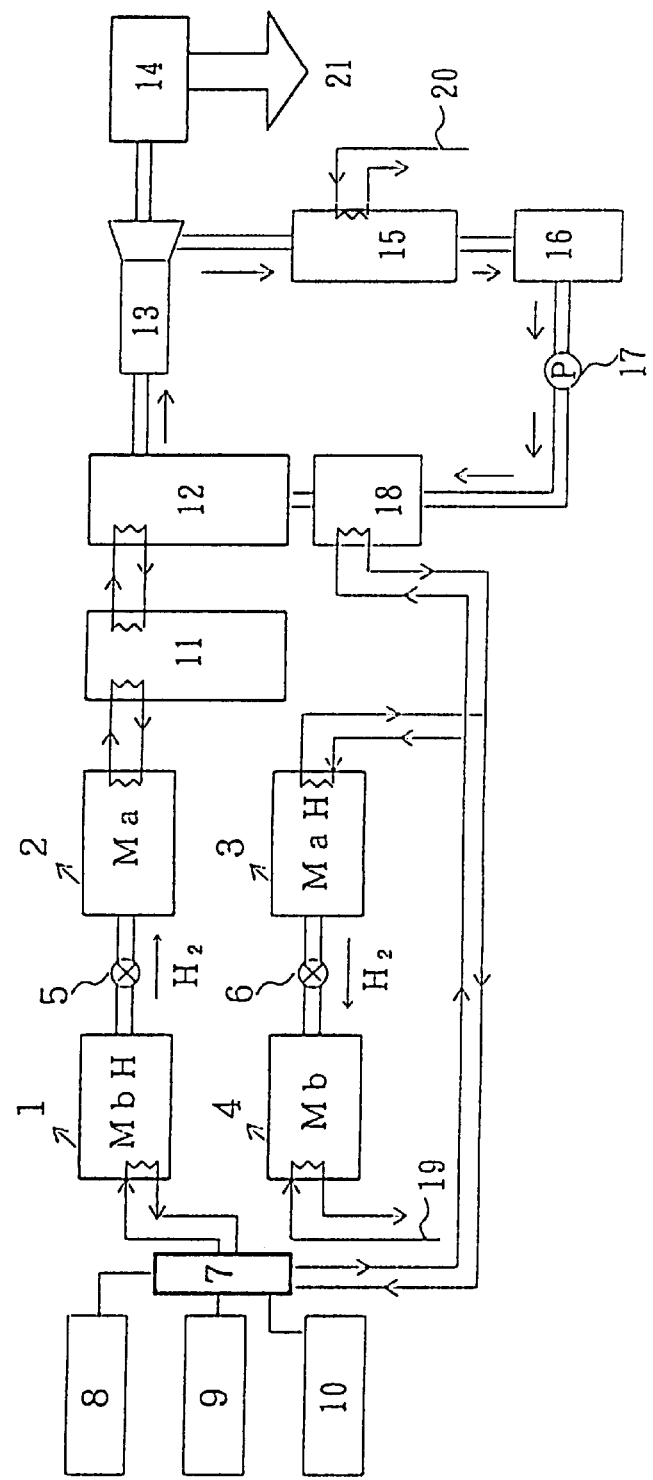
FIG. 1 is a block diagram showing a power generating device employing hydrogen absorbing alloys and low heat relating to the present invention.

One of preferable embodiments will be described hereinafter referring to the drawings.

As shown in FIG. 1, the present power generating device employing hydrogen absorbing alloys and low heat mainly comprises hydrogen absorbing alloy heat exchanger containers 1, 2, 3, 4 loaded with the hydrogen absorbing alloys, a low temperature heat storage tank 7, a high temperature heat storage tank 11, a cooling medium vaporizer 12, a gas turbine 13 and a power generator 14.

Low quality heat sources (from 30 to 60° C.) such as heat 8 collected by solar energy collectors, heat of terrestrial heat energy, warm waste water 9 discharged from hot springs, low quality energy of waste heat discharged from factories or warm waste water discharged from garbage destructors, and exhaust gas 10 are stored in the low temperature heat storage tank 7.

Figure 2:
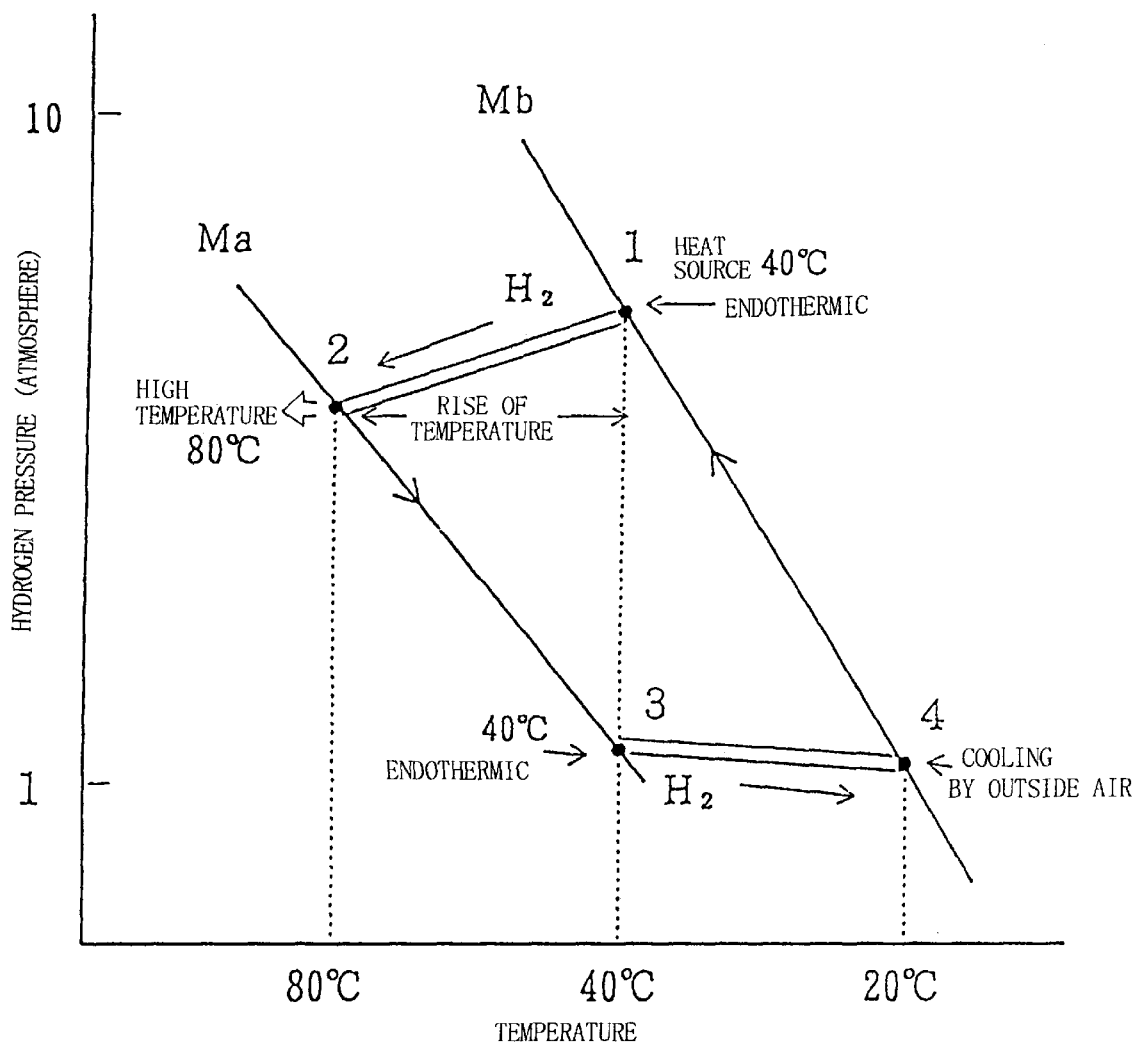
FIG. 2 is a table showing heat generation cycles to drive a power generating device employing hydrogen absorbing alloys and low heat relating to the present invention.

Two sets of two types of hydrogen absorbing alloys Ma, Mb having different thermal equilibrium hydrogen pressure characteristics which are loaded respectively in two hydrogen absorbing alloy heat exchanger containers are prepared. Namely, the hydrogen absorbing alloy Ma is loaded in the hydrogen absorbing alloy heat exchanger containers 2, 3, and the hydrogen absorbing alloy Mb is loaded in the hydrogen absorbing alloy heat exchanger containers 1, 4. The hydrogen absorbing alloy heat exchanger containers in each of the sets are connected to each other by means of a valve 5, 6 so that hydrogen gas can move thorough the valves. In the sets, the hydrogen absorbing alloy Mb has a higher equilibrium hydrogen pressure than that of the hydrogen absorbing alloy Ma at the same temperature as shown in FIG. 2. In FIG. 1, 15 shows a medium condenser, 16 shows a tank, 17 shows a medium feed-back pump, 18 shows a preheater, and 19 and 20 show cooling water.

How the power generating device comprises as described above is operated will be described hereinafter.

The hydrogen absorbing alloy Mb in the hydrogen absorbing alloy heat exchanger container 1 at a low temperature side having a higher equilibrium hydrogen pressure absorbs hydrogen to become a metallic hydrogen compound MbH. The hydrogen absorbing alloy heat exchanger container 1 is heated with low temperature water of 40° C. obtained from unused low quality heat sources 8, 9, 10 in the heat storage tank 7, resulting in an endothermic reaction of the metallic hydrogen compound MbH to release hydrogen since pressure inside the hydrogen absorbing alloy heat exchanger container 1 is increased. The released hydrogen is moved to the hydrogen absorbing alloy heat exchanger container 2 to be absorbed by the hydrogen absorbing alloy Ma at a high temperature side having a lower equilibrium hydrogen pressure. Then an exothermic reaction occurs to release high temperature heat of 80° C. to generate hot water which is stored in the high temperature storage tank 11. Thus heat having a high temperature can be obtained from heat having a low temperature. The cooling medium vaporizer 12 is heated with the hot water to vaporize the medium so that so obtained vapour drives turbine 13 to generate power 21 at the power generator 14.

While, in a recycling process, a metallic hydrogen compound MaH in the hydrogen absorbing alloy heat exchanger container 3 is heated with low temperature water of 40° C. in the low temperature heat storage tank 7 resulting in an endothermic reaction to release hydrogen, since a pressure inside the hydrogen absorbing alloy heat exchanger container 3 is increased. The released hydrogen gas falls in temperature to the air outside of 20° C., and is moved to the hydrogen absorbing alloy heat exchanger container 4 having a decreased pressure so that the hydrogen absorbing alloy Mb at a low temperature side having a higher equilibrium hydrogen pressure absorbs the released hydrogen gas to become again a metallic hydrogen compound MbH so as to repeat the cycle.

As described above, by employing at least two sets of hydrogen absorbing alloys Ma and Mb, high temperature heat can be successively generated and a uniform amount of hydrogen gas can be repeatedly moved between the hydrogen absorbing alloys Ma and Mb with no loss. The present power generating device can be successively driven by heating the cooling medium vaporizer with the successively generated high temperature heat, vaporizing the medium and driving the turbine with the vapour.

As the hydrogen absorbing alloys Ma and Mb, hydrogen absorbing alloys having different equilibrium hydrogen pressures are used. To put it concretely, rare earth hydrogen absorbing alloys are favorably combined and used, for example, $LaNi_{5-x}Al_x$, $MmNi_{5-x}Al_x$, $MmNi_{5-x}Mn_x$, $MmNi_{5-x}Al_{x-y}Mn_y$ ($0<X\leq1.0$, $0<Y\leq0.5$) can be used as the hydrogen absorbing alloy Ma, and $LaNi_5$, $MmNi_{5-x}Al_x$, $MmNi_{5-x}Mn_x$ ($0<X\leq1.0$) can be used as the hydrogen absorbing alloy Mb, however, there is no restriction for the hydrogen absorbing alloys. The above mentioned Mm means Misch metal which is a mixture of rare earth metals.

The following table shows one example of principal conditions to operate the present power generating device employing hydrogen absorbing alloys and low heat.

| | |
|---|---|
| AMOUNT OF GENERATED POWER | 100 KW |
| AMOUNT OF GENERATED HEAT | 250 KW |
| KIND OF HYDROGEN ABSORBING ALLOY | RARE EARTH HYDROGEN ABSORBING ALLOYS |
| AMOUNT OF HYDROGEN ABSORBING ALLOY | 10,000 KG |
| AMOUNT OF HYDROGEN | 850 $Nm^3$ |
| THERMAL CONVERSION EFFICIENCY | 70% |
| TEMPERATURE OF HIGH TEMPERATURE HEAT SOURCE | 80–90° C. |
| TEMPERATURE OF LOW TEMPERATURE HEAT SOURCE | 30–60° C. |

INDUSTRIAL APPLICABILITY

The present power generating device employing hydrogen absorbing alloys and low heat can convert low quality (low temperature) heat energy such as solar energy, terrestrial heat energy, energy from factories and garbage destructors into high quality (high temperature) heat by employing hydrogen absorbing alloys and enables to generate power efficiently with the heat so that the present invention can reduce consumption of oil and contribute to preserve the earth environment.

What is claimed is:

1. A power generating device employing hydrogen absorbing alloy and low heat and further comprising:

two types of hydrogen absorbing alloys which are able to reversibly absorb and release hydrogen gas and which have different thermal equilibrium hydrogen pressure characteristics;

said two types of hydrogen absorbing alloys loaded respectively in a first determined hydrogen absorbing alloy heat exchanger container and a second determined hydrogen absorbing alloy heat exchanger container which are connected ventably to each other;

at least two sets of heat generating cycles which employ heat generated when hydrogen gas is moved between said first and second hydrogen absorbing alloy heat exchanger containers provided;

a hydrogen compound of one of said hydrogen absorbing alloys at a low temperature side having a higher equilibrium pressure at the same temperature is heated by at least one low quality heat source having a temperature from 30° to 60° C. to release hydrogen;

said released hydrogen absorbed by the other hydrogen absorbing alloy at a high temperature side having a lower equilibrium hydrogen pressure to generate heat having a temperature from 80° to 90° C. which is higher than the temperature of the low quality heat source;

said heat is transmitted to a cooling medium vaporizer to generate cooling medium vapour; and where power is generated by a gas turbine driven by pressure of said cooling medium vapour.

2. A power generating device as set forth in claim 1 wherein said hydrogen absorbing alloy is selected from the group consisting of:

$MmNi_{5-x}Al_x$;

$MmNi_{5-x}Mn_x$;

$MmNi_{5-x}Al_{x-y}Mn_y$; where ($0<X\leq1.0$, $0<Y\leq0.5$) is used as said hydrogen absorbing alloy.

* * * * *